March 11, 1941.    R. H. FLEET ET AL    2,234,522
SUPPORTING CARRIAGE
Original Filed Feb. 2, 1937    2 Sheets-Sheet 1
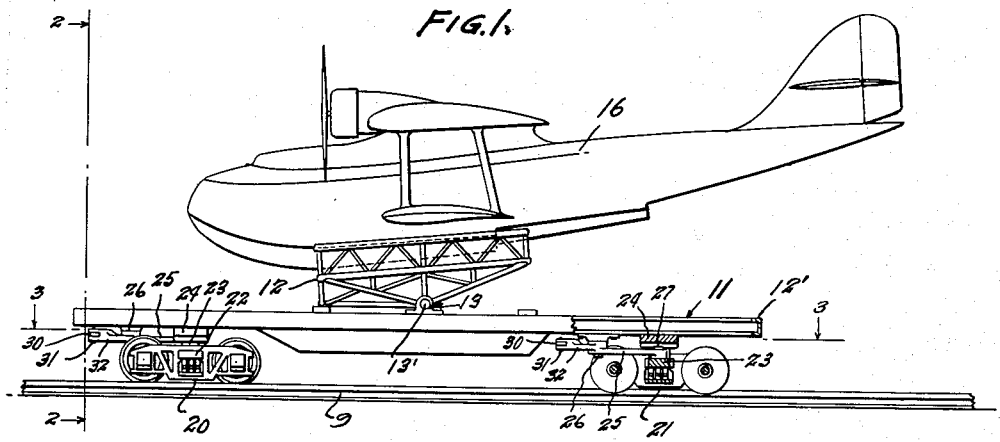
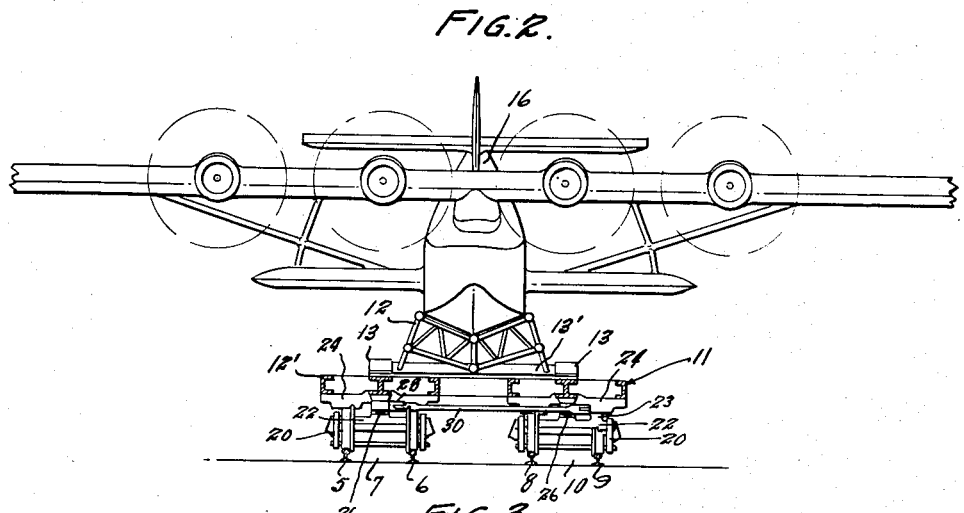
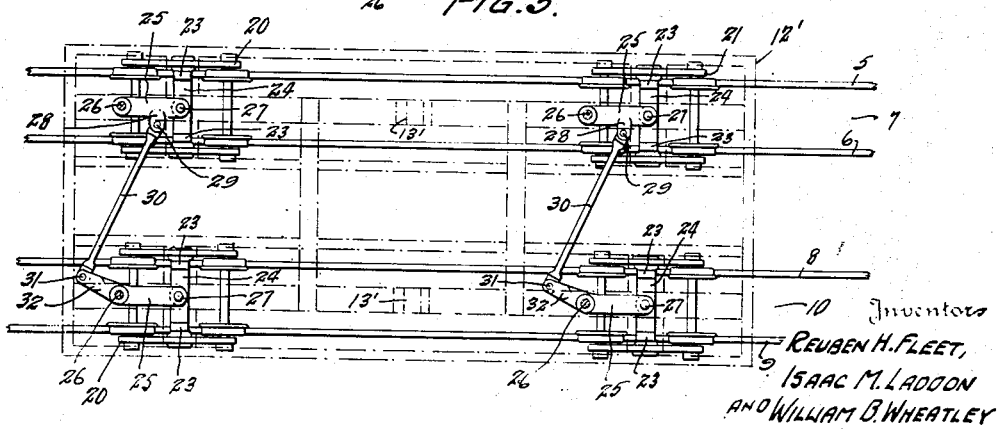
Inventors
REUBEN H. FLEET,
ISAAC M. LADDON
AND WILLIAM B. WHEATLEY
By Semmes & Semmes
Attorneys March 11, 1941. R. H. FLEET ET AL 2,234,522
SUPPORTING CARRIAGE
Original Filed Feb. 2, 1937    2 Sheets-Sheet 2
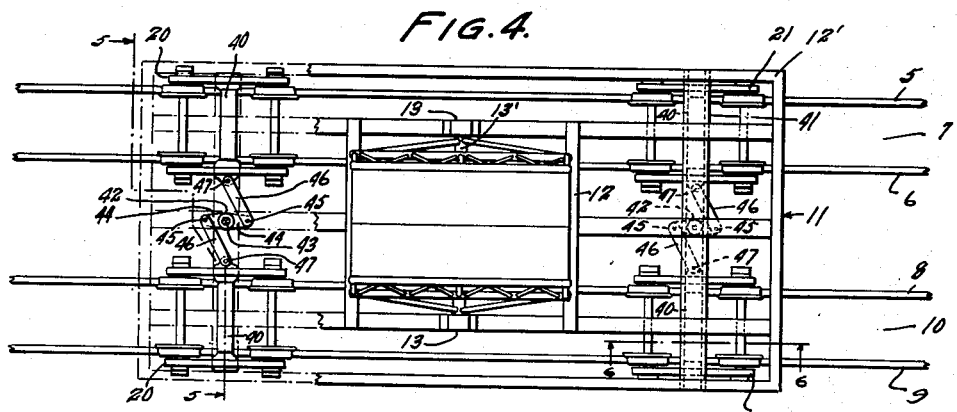
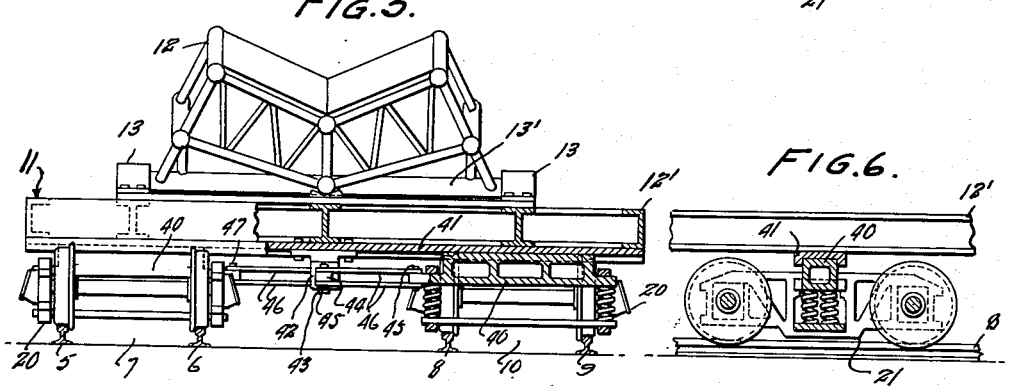
Inventors
REUBEN H. FLEET,
ISAAC M. LADDON
AND WILLIAM B. WHEATLEY
By Semmes & Semmes
Attorneys Patented Mar. 11, 1941

2,234,522

UNITED STATES PATENT OFFICE 2,234,522

SUPPORTING CARRIAGE

Reuben H. Fleet, William B. Wheatley, and Isaac M. Laddon, San Diego, Calif.

Application February 2, 1937, Serial No. 123,682
Renewed June 13, 1939

18 Claims. (Cl. 105—1)

This invention relates to vehicles adapted to travel on tracks and in particular rail tracks.

The invention has particular application to the launching of airplanes from vehicles supported on double track railroads, although it has other applications and is not to be limited to this particular use.

In our copending applications, Serial Numbers 105,610 and 117,234, we have described systems for launching airplanes from moving vehicles. It is highly desirable that the vehicles be stable laterally and therefore it is desirable that the distance between the outside wheels on which the vehicles run shall be relatively great. In many localities it will be possible to find double track rail systems and these systems may be employed to support the launching vehicle. Often there is considerable variation between tracks in any given stretch of road bed. It is highly desirable that the vehicle on which the airplane is supported for launching be held centered between the tracks, so that any variation of distance between tracks will not cause the vehicle to be unsteady, or the wheels of the trucks to be subjected to forces which may tend to de-rail the vehicle.

It is an object of our invention to provide a construction for supporting the vehicle which will hold the load supporting member centered with respect to rails or plurality of tracks with double rails, where the distances between the rails, or between tracks varies during the travel of the vehicle.

Another object of the invention is to provide a construction which is sturdy, strong, easy and cheap to manufacture, repair, and replace.

A still further object of the invention is to provide a construction which will eliminate unnecessary strain on the vehicle, and provide a steady base from which launching of airplanes may be effected. Another object of the invention is to provide a system for launching airplanes where the base of the supporting vehicle may be broadened laterally by being caused to travel on parallel rails equally spaced, wherein the vehicle may be caused to straddle two, three, or four or more of the rails. In this instance vehicles of different width between opposite wheels are employed.

With these and other objects in view, which may be incident to our improvements, the invention consists in the parts and combinations to be hereinafter set forth and claimed, with the understanding that the several necessary elements comprising our invention may be varied in construction, proportions and arrangements, without departing from the spirit and scope of the appended claims.

In order to make our invention more clearly understood, we have shown in the accompanying drawings means for carrying the same into practical effect without limiting the improvements in their useful applications to the particular constructions which, for the purpose of explanation, have been made the subject of illustration.

In the drawings:

Figure 1 is a view in side elevation of our vehicle showing an airplane mounted on a pivoted cradle.

Figure 2 is a view taken along the line 2—2 of Figure 1 looking in the direction of the arrows.

Figure 3 is a view taken along the line 3—3 of Figure 1 looking in the direction of the arrows, the launching platform lying above the plane from which the view is taken being shown in dotted lines.

Figure 4 is a top plan view of another modification of our invention, parts being broken away to more clearly show the construction.

Figure 5 is a view taken along the line 5—5 of Figure 4 looking in the direction of the arrows.

Figure 6 is a view taken along the line 6—6 of Figure 4 looking in the direction of the arrows.

Figure 7 is a top plan view of another modification of our device, part of the load supporting member being broken away to more clearly show the position of the parts, the pivoted cradle being removed from the loading platform.

Figure 8 is a view taken along the line 8—8 of Figure 7 looking in the direction of the arrows.

Figure 9 is a view taken along the line 9—9 of Figure 7 looking in the direction of the arrows.

Referring to the drawings, Figures 1 to 3 inclusive, we have shown a double track system comprising an outer rail 5 and an inner rail 6 of a pair of rails 7 and an inner rail 8 and an outer rail 9 of a pair of rails 10. A vehicle 11 having a launching cradle 12 pivoted at 13 on the vehicle 11 is adapted to travel on the rails of the double track system. In using a railroad siding or other sections of double track rails there is often a considerable variation in the distance between tracks such as tracks 7 and 10. This invention permits the vehicle 11 to be kept centered between the tracks 7 and 10 even though the distance between these tracks may vary considerably in the run which the vehicle must take in order to acquire sufficient speed to launch an airplane from the vehicle. We have shown the vehicle 11 having a load carrying member 12' which may be formed of a cross braced U and I-beam construction. Pivoted on the load supporting member 12' on pivots 13 is a supporting shaft 13' carrying the pivoted cradle 12. On the cradle 12 is adapted to rest an airplane. There is shown on cradle 12 a flying boat 16. It is to be understood that other types of airplanes than the flying boat may be used and that other constructions for supporting the airplane may be employed other than a pivoted cradle. In fact the invention is not to be limited to any particular form of airplane supporting device or load carrying member.

Mounted on the rail tracks 7 and 10 are front wheeled trucks 20 and rear wheeled trucks 21. The truck construction is the usual type and needs no special description. Each truck carries a bolster 22 and each bolster is provided with buffers 23. The buffers 23 contact with buffer beams 24 which are mounted under the supporting or load carrying member 12'. We have shown tension links 25 which are pivoted at 26 to the load supporting member and at 27 to the bolsters 22. It is to be noted that this tension link construction gives a caster effect to the trucks. It is contemplated in general that the motive power for driving the airplane supporting vehicle shall be the motive power plant of the airplane. When this system is employed, the motive power for moving the vehicle is transmitted through a pull on the load supporting member 12' which is transmitted through the tension links 25 to the trucks.

One tension link for each truck in a pair carries an extension 28 to which is pivoted at 29 a connecting rod 30, the other end of the connecting rod 30 is pivoted at 31 to a lever arm 32 which is in effect an extension of the other tension link attached to the other truck of the pair.

The construction is such that the distance between the center of the pivot 26 and the center of the pivot 29 is approximately equal to the distance between the center of the pivot 31 and the center of the pivot 26 of the other tension link. A straight line drawn through the center of pivots 26 and 29 is approximately perpendicular to a straight line drawn through pivots 29 and 31. Likewise a straight line drawn through the center of pivots 29 and 31 is approximately perpendicular to the straight line drawn through the pivot 31 and the pivot 26 of the other tension link. This construction causes the supporting member 12' to be held centered by the trucks. Strains, or accidents which might be caused by variations in the distances between tracks 7 and 10 are eliminated. Thus, a broad base launching vehicle may be used in many instances where it would be unsafe or impractical to employ a launching vehicle on a double track system.

In Figures 4 to 6 inclusive, we have shown another modification of our invention. Here the tension links are dispensed with. Each truck is provided with a bolster 40 which may be of square shape. The bolsters 40 of each pair of trucks are adapted to slide in a guide 41 which is bolted or otherwise suitably attached to the undersurface of the load supporting member 12'. It is to be noted that the shape of the bolster 40 and the guide 41 can be varied. The construction is such as to permit movement of the bolsters (and hence their attached trucks) laterally to accommodate varying distances between the tracks 7 and 10. In order to hold the load supporting member 12 centered on the tracks 7 and 10 there is provided a compensating lever 42 for each pair of trucks. Each compensating lever 42 is pivoted at 43 to the load carrying member 12'. Pivoted to each arm 44 of each compensating lever 43 at pivot points 45 are connecting links or rods 46 which are pivoted at their other ends at 47 to bolsters 40. This construction permits the trucks to move toward and from each other at the front and the rear of the supporting vehicle 11, while maintaining the load supporting member approximately centered between the trucks.

In Figures 7 to 9 we have shown yet another form of device. In this form of device there is a buffer beam 50 located under the load supporting member 12'. These buffer beams 50 are adapted to contact buffers 51 carried by bolsters 52 which are attached to each truck. Pivoted to the bolsters 52 at 53 are tension links 54 which are pivoted at 55 to the load supporting member 12'. Pivotally attached at 56 to the buffers 52 are connecting links 57 which are pivotally attached at 58 to the arms 59 of a compensating lever 60. The compensating lever 60 is pivoted at 61 to the load carrying member 12. This construction permits a caster effect for the trucks while compensating for the varying distance between the tracks 7 and 10.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A vehicle adapted to run on rails of double track systems comprising a plurality of pairs of trucks adapted to run on opposite tracks, a load carrying member supported on the trucks, tension links for each truck of a pair pivoted to the load carrying member and to the truck, a lever arm carried by one tension link on one truck of a pair, and a connecting rod pivoted to the lever arm and to the tension link for the other truck of the pair whereby the load carrying member is held centered in compensating for varying distances between trucks in a pair.

2. A vehicle adapted to run on rails of double track systems comprising a plurality of pairs of trucks adapted to run on opposite tracks, a load carrying member supported on the trucks, tension links for each truck of a pair pivoted to the load carrying member and to the truck, a lever arm on one tension link for one truck of a pair extending beyond the pivot for the load carrying member, and a connecting rod pivoted to the lever arm and to the tension link for the other truck of the pair between its points of pivoting to the load carrying member and truck.

3. A vehicle adapted to run on rails of double track systems comprising a plurality of pairs of trucks adapted to run on opposite tracks, a load carrying member supported on the trucks, tension links for each truck of a pair pivoted to the load carrying member and to the truck, a lever arm extending beyond the pivot for the load carrying member on one tension link on one truck of a pair, and a connecting rod pivoted to the lever arm and to the tension link for the other truck of the pair between its points of pivoting to the load carrying member and truck, the length of the lever arm between its pivot points and the distance between the point of pivoting of the connecting rod to the tension link and the point of pivoting for the load supporting member on the same tension link being approximately equal.

4. A vehicle adapted to run on rails of double track systems comprising a plurality of pairs of trucks adapted to run on opposite tracks, a load carrying member supported on the trucks, tension links for each truck of a pair pivoted to the load carrying member and to the truck, a lever arm carried by one tension link on one truck of a pair, a connecting rod pivoted to the lever arm and to the tension link for the other truck of the pair, parts being so proportioned and arranged that in normal position a straight line drawn through the points of pivoting of the connecting rod is substantially perpendicular to lines drawn through the points of pivoting of the load carrying member on the tension links and the points of pivoting of the connecting rod.

5. A vehicle adapted to run on rails of double track systems comprising a plurality of pairs of trucks adapted to run on opposite tracks, a load carrying member supported on the trucks, tension links for each truck of a pair pivoted to the load carrying member and to the truck, a lever arm carried by one tension link on one truck of a pair, a connecting rod pivoted to the lever arm and to the tension link for the other truck of the pair, parts being so proportioned and arranged that in normal position a straight line drawn through the points of pivoting of the connecting rod is substantially perpendicular to lines drawn through the points of pivoting of the load carrying member on the tension links and the points of pivoting of the connecting rod, the length of the lever arm between its pivot points and the distance between the point of pivoting of the connecting rod to the tension link and to the point of pivoting for the load supporting member on the same tension link being approximately equal.

6. A vehicle adapted to run on rails of double track systems comprising a plurality of pairs of trucks adapted to run on opposite tracks, a load carrying member supported on the trucks, tension links for each truck of a pair pivoted to the load carrying member and to the truck, the point of pivoting to the load carrying member being in normal direction of travel in front of the point of pivoting to the truck, a lever arm carried by one tension link on one truck of a pair, and a connecting rod pivoted to the lever arm and to the tension link for the other truck of the pair, whereby the load carrying member is held centered in compensating for varying distances between trucks in a pair.

7. A vehicle adapted to run on rails of double track systems comprising a plurality of pairs of trucks adapted to run on opposite tracks, a load carrying member supported on the trucks, tension links for each truck of a pair pivoted to the load carrying member and to the truck, the point of pivoting to the load carrying member being in normal direction of travel in front of the point of pivoting to the truck, a lever arm extending beyond the point of pivoting for the load carrying member on one tension link on one truck of a pair, and a connecting rod pivoted to the lever arm and to the other tension link for the other truck of the pair between its points of pivoting to the load carrying member and other truck.

8. In a vehicle adapted to run on a plurality of double rail tracks, a plurality of pairs of trucks adapted to run on opposite tracks, a bolster for each truck, a load carrying member, tension links for each truck pivoted to the bolster and to the load carrying member, a compensating lever having arms pivoted to the load carrying member between opposite trucks and connecting links pivoted to the arms of the compensating lever and to the bolsters of opposite trucks in each pair of trucks.

9. In a vehicle adapted to run on a plurality of double rail tracks, a plurality of pairs of trucks adapted to run on opposite tracks, a bolster for each truck, a load carrying member, tension links for each truck pivoted to the bolster and to the load carrying member, a compensating lever having arms pivoted to the load carrying member between opposite trucks and connecting links pivoted to the arms of the compensating lever and to the bolsters of opposite trucks in each pair of trucks, and means permitting movement of the bolsters with respect to the load carrying member.

10. In a vehicle adapted to run on a plurality of double rail tracks, a plurality of pairs of trucks adapted to run on opposite tracks, a bolster for each truck, a load carrying member, a tension link for each truck pivoted to the bolster and to the load carrying member, a compensating lever having arms pivoted to the load carrying member between opposite trucks, connecting links pivoted to the arms of the compensating lever and to the bolsters of opposite trucks in each pair of trucks, a buffer beam mounted on the underside of the load carrying member adjacent each truck and a buffer carried by each bolster adapted to slideably contact a buffer beam.

11. A device of the character described adapted to run on a double track rail system, comprising pairs of trucks adapted to run on opposite tracks, bolsters for the trucks, a load carrying member, guides carried by the load carrying member in which the bolsters are adapted to slide, means to anchor the load carrying member to the pairs of trucks and pivoted linkage means to cause the trucks to move to accommodate for varying distances between opposite tracks while holding the load carrying member centered between the trucks.

12. A device of the character described adapted to run on a double track rail system comprising pairs of trucks adapted to run on opposite tracks, bolsters for the trucks, a load carrying member, guides carried by the load carrying member in which the bolsters are adapted to slide, a compensating lever having arms pivoted to the load carrying member between opposite trucks and connecting rods pivoted to the arms of the compensating lever and to the bolsters of opposite trucks in each pair of trucks.

13. A vehicle construction for carrying a load on rail tracks comprising a load carrying member, wheels adapted to run on the rails and adapted to carry the weight of the load and the load carrying member, and pivoted linkage means to maintain the load carrying member centered with respect to the rails when the distance between the rails varies.

14. A vehicle adapted to run on rails of double track systems comprising a plurality of pairs of trucks adapted to run on opposite tracks, a load carrying member supported on the trucks, tension links for each truck of a pair pivoted to the load carrying member and to the truck, means carried by one tension link on one truck of a pair extending beyond the pivot for the load carrying member, and a connecting rod pivoted to said means and to the tension link for the other truck of the pair whereby the load carrying member is held centered in compensating for varying distances between trucks in a pair.

15. A vehicle adapted to run on rails of double track systems comprising a plurality of pairs of trucks adapted to run on opposite tracks, a load carrying member supported on the trucks, tension links for each truck of a pair pivoted to the load carrying member and to the truck, a lever arm carried by one tension link on one truck of a pair, and rigid means pivoted to the lever arm and to the tension link for the other truck of the pair whereby the load carrying member is held centered in compensating for varying distances between trucks in a pair.

16. A vehicle adapted to run on rails of double track systems comprising a plurality of pairs of trucks adapted to run on opposite tracks, a load carrying member supported on the trucks, tension links for each truck of a pair pivoted to the load carrying member and to the truck, means on one tension link for one truck of a pair extending beyond the pivot for the load carrying member, and a connecting rod pivoted to said means and to the tension link for the other truck of the pair between its points of pivoting to the load carrying member and the truck.

17. A device of the character described adapted to run on a double track rail system comprising a plurality of pairs of trucks adapted to run on opposite tracks, bolsters for the trucks, a load carrying member, guides carried by the load carrying member in which the bolsters are adapted to slide, means to anchor the load carrying member to the pairs of trucks, and pivoted linkage means to cause the trucks to move to accommodate for varying distances between opposite tracks while holding the load carrying member centered between the trucks.

18. A device of the character described adapted to run on a double track rail system comprising a plurality of pairs of trucks adapted to run on opposite tracks, bolsters for the trucks, a load carrying member, guides carried by the load carrying member in which the bolsters are adapted to slide, a compensating lever having arms pivoted to the load carrying member between opposite trucks, and connecting rods pivoted to the arms of the compensating lever and to the bolsters of opposite trucks in each pair of trucks.

REUBEN H. FLEET.
WILLIAM B. WHEATLEY.
ISAAC M. LADDON.